US008033905B2

(12) United States Patent
Irwin, Jr. et al.

(10) Patent No.: US 8,033,905 B2
(45) Date of Patent: Oct. 11, 2011

(54) PREPRINTED LOTTERY TICKETS USING A PLAYER ACTIVATED ELECTRONIC VALIDATION MACHINE

(75) Inventors: Kenneth E. Irwin, Jr., Dawsonville, GA (US); Gary R. Streeter, Andover, MA (US); Chuck Kline, Camp Hill, PA (US)

(73) Assignee: Scientific Games International, Inc., Newark, DE (US)

( * ) Notice: Subject to any disclaimer, the term of this patent is extended or adjusted under 35 U.S.C. 154(b) by 1096 days.

(21) Appl. No.: 11/412,340

(22) Filed: Apr. 27, 2006

(65) Prior Publication Data

US 2007/0010311 A1 Jan. 11, 2007

Related U.S. Application Data

(60) Provisional application No. 60/675,186, filed on Apr. 27, 2005.

(51) Int. Cl.
*A63F 13/02* (2006.01)
*A63F 13/10* (2006.01)
*A63F 3/06* (2006.01)

(52) U.S. Cl. ............... 463/17; 463/25; 463/29; 273/269

(58) Field of Classification Search .............. 463/17–19, 463/25, 29; 273/269, 270; 283/49, 903, 283/73
See application file for complete search history.

(56) References Cited

U.S. PATENT DOCUMENTS

| | | | | |
|---|---|---|---|---|
| 1,527,929 A | | 2/1925 | Simons | |
| 3,089,123 A | | 5/1963 | Hennis et al. | |
| 3,245,697 A | | 4/1966 | Nugent | |
| 3,699,311 A | | 10/1972 | Dunbar | |
| 3,736,368 A | | 5/1973 | Vogelman et al. | |
| 3,826,499 A | | 7/1974 | Lenkoff | |
| 3,868,057 A | | 2/1975 | Chavez | |
| 3,876,865 A | * | 4/1975 | Bliss | 235/492 |
| 3,902,253 A | | 9/1975 | Sabuzawa et al. | |
| 3,918,174 A | | 11/1975 | Miller et al. | |
| 3,922,529 A | | 11/1975 | Orloff | |
| 3,934,120 A | | 1/1976 | Maymarev | |
| 4,017,834 A | | 4/1977 | Cuttill et al. | |
| 4,095,824 A | | 6/1978 | Bachman | |
| 4,105,156 A | | 8/1978 | Dethloff | |

(Continued)

FOREIGN PATENT DOCUMENTS

AU B-18428/92 12/1992

(Continued)

OTHER PUBLICATIONS

EPO Search Report, Feb. 4, 2009.

(Continued)

*Primary Examiner* — David L Lewis
*Assistant Examiner* — Matthew D. Hoel
(74) *Attorney, Agent, or Firm* — Dority & Manning, P.A.

(57) ABSTRACT

A lottery game played on an electronic game machine using a pre-printed lottery ticket is disclosed. The lottery ticket is embedded with game and prize information that can be read by the game machine. After inserting the lottery ticket into the game machine, the player may play a game using the game machine based upon the information on the lottery ticket. If the player is a winner, an award is given to the player. The player can redeem the award for cash with the lottery authority.

19 Claims, 3 Drawing Sheets

U.S. PATENT DOCUMENTS 4,176,406 A 11/1979 Matkan
4,191,376 A 3/1980 Goldman et al.
4,194,296 A 3/1980 Pagnozzi et al.
4,195,772 A 4/1980 Nishimura
4,206,920 A 6/1980 Weatherford et al.
4,241,942 A 12/1980 Bachman
4,243,216 A 1/1981 Mazumber
4,273,362 A 6/1981 Carrier et al.
4,309,452 A 1/1982 Sachs
4,313,087 A 1/1982 Weitzen et al.
4,355,300 A 10/1982 Weber
4,375,666 A 3/1983 Buck et al.
4,398,708 A 8/1983 Goldman et al.
4,407,443 A 10/1983 McCorkle
4,451,759 A 5/1984 Heynisch
4,455,039 A 6/1984 Weitzen et al.
4,457,430 A 7/1984 Darling et al.
4,464,423 A 8/1984 LaBianca et al.
4,466,614 A 8/1984 Bachman et al.
4,488,646 A 12/1984 McCorkle
4,491,319 A 1/1985 Nelson
4,494,197 A 1/1985 Troy et al.
4,536,218 A 8/1985 Ganho
4,544,184 A 10/1985 Freund et al.
4,579,371 A * 4/1986 Long et al. ...................... 283/83
4,591,189 A 5/1986 Holmen et al.
4,634,149 A 1/1987 Donovan
4,665,502 A 5/1987 Kreisner
4,669,729 A 6/1987 Solitt et al.
4,689,742 A 8/1987 Troy et al.
4,726,608 A 2/1988 Walton
4,736,109 A 4/1988 Dvorzsak
4,740,016 A 4/1988 Konecny et al.
4,754,418 A * 6/1988 Hara ........................ 361/679.56
4,760,247 A 7/1988 Keane et al.
4,763,927 A 8/1988 Schneider
4,764,666 A * 8/1988 Bergeron ........................ 463/25
4,775,155 A 10/1988 Lees
4,792,667 A 12/1988 Chen
4,805,907 A 2/1989 Hagiwara
4,817,951 A 4/1989 Crouch et al.
4,835,624 A 5/1989 Black et al.
4,836,546 A 6/1989 Dire et al.
4,836,553 A 6/1989 Suttle et al.
4,837,728 A 6/1989 Barrie et al.
4,856,787 A 8/1989 Itkis
4,861,041 A 8/1989 Jones et al.
4,870,260 A 9/1989 Niepolomski et al.
4,880,964 A 11/1989 Donahue
4,882,473 A * 11/1989 Bergeron et al. ............... 463/25
4,888,244 A 12/1989 Klinge
4,922,522 A 5/1990 Scanlon
4,943,090 A 7/1990 Fienberg
4,960,611 A 10/1990 Fujisawa et al.
4,961,578 A 10/1990 Chateau
4,964,642 A 10/1990 Kamille
4,996,705 A 2/1991 Entenmann et al.
4,998,010 A 3/1991 Chandler et al.
4,998,199 A 3/1991 Tashiro et al.
5,032,708 A 7/1991 Comerford et al.
5,037,099 A 8/1991 Burtch
5,046,737 A 9/1991 Fienberg
5,074,566 A 12/1991 Desbiens
5,083,815 A 1/1992 Scrymgeour et al.
5,092,598 A 3/1992 Kamille
5,094,458 A 3/1992 Kamille
5,100,139 A 3/1992 Di Bella
5,109,153 A 4/1992 Johnson et al.
5,112,050 A 5/1992 Koza et al.
5,116,049 A 5/1992 Sludikoff et al.
5,118,109 A 6/1992 Gumina
5,119,295 A 6/1992 Kapur
5,158,293 A 10/1992 Mullins
5,165,967 A 11/1992 Theno et al.
5,186,463 A 2/1993 Marin et al.
5,189,292 A 2/1993 Batterman et al.
5,193,815 A 3/1993 Pollard
5,193,854 A 3/1993 Borowski, Jr. et al.
5,228,692 A 7/1993 Carrick et al.
5,232,221 A 8/1993 Sludikoff et al.
5,234,798 A 8/1993 Heninger et al.
5,249,801 A 10/1993 Jarvis
5,259,616 A 11/1993 Bergmann
5,273,281 A 12/1993 Lovell
5,276,980 A 1/1994 Carter et al.
5,282,620 A 2/1994 Keesee
5,308,992 A 5/1994 Crane et al.
5,317,135 A 5/1994 Finocchio
5,326,104 A 7/1994 Pease et al.
5,332,219 A 7/1994 Marnell, II et al.
5,342,047 A 8/1994 Hiedel et al.
5,342,049 A 8/1994 Wichinsky et al.
5,344,144 A 9/1994 Canon
5,346,258 A 9/1994 Behn et al.
5,380,007 A 1/1995 Travis et al.
5,393,057 A 2/1995 Marnell, II et al.
5,401,024 A 3/1995 Simunek
5,401,541 A 3/1995 Simunek
5,403,039 A 4/1995 Borowski, Jr. et al.
5,407,199 A 4/1995 Gumina
5,420,406 A 5/1995 Izawa et al.
5,432,005 A 7/1995 Tanigami et al.
5,451,052 A 9/1995 Behm et al.
5,453,602 A 9/1995 Hanada
5,456,465 A 10/1995 Durham
5,471,039 A 11/1995 May
5,471,040 A 11/1995 May
5,475,205 A 12/1995 Behm et al.
5,486,005 A 1/1996 Neal
5,513,846 A 5/1996 Niederlien et al.
5,528,154 A 6/1996 Leichner et al.
5,536,016 A 7/1996 Thompson
5,540,442 A 7/1996 Orselli et al.
5,548,110 A 8/1996 Storch et al.
5,550,746 A 8/1996 Jacobs
5,560,610 A 10/1996 Behm et al.
5,564,700 A 10/1996 Celona
5,564,977 A 10/1996 Algie
5,591,956 A 1/1997 Longacre, Jr. et al.
5,599,046 A * 2/1997 Behm et al. ..................... 283/83
5,602,381 A 2/1997 Hoshino et al.
5,621,200 A 4/1997 Irwin et al.
5,628,684 A 5/1997 Bouedec
5,630,753 A 5/1997 Fuchs
5,651,735 A 7/1997 Baba
5,655,961 A 8/1997 Acres et al.
5,667,250 A 9/1997 Behm et al.
5,682,819 A 11/1997 Beatty
5,690,366 A 11/1997 Luciano
5,704,647 A 1/1998 Desbiens
5,722,891 A 3/1998 Inoue
5,726,898 A 3/1998 Jacobs
5,732,948 A 3/1998 Yoseloff
5,741,183 A 4/1998 Acres et al.
5,743,800 A 4/1998 Huard et al.
5,752,882 A 5/1998 Acres et al.
5,756,220 A 5/1998 Hoshino et al.
5,768,142 A 6/1998 Jacobs
5,769,458 A 6/1998 Carides et al.
5,770,533 A 6/1998 Franchi
5,772,509 A 6/1998 Weiss
5,772,510 A * 6/1998 Roberts ........................... 463/17
5,772,511 A 6/1998 Smeltzer
RE35,864 E 7/1998 Weingardt
5,779,840 A 7/1998 Boris
5,789,459 A 8/1998 Inagaki et al.
5,791,990 A * 8/1998 Schroeder et al. .............. 463/17
5,797,794 A 8/1998 Angell
5,803,504 A 9/1998 Deshiens et al.
5,816,920 A 10/1998 Hanai
5,818,019 A * 10/1998 Irwin et al. .................... 235/375
5,820,459 A 10/1998 Acres et al.
5,823,874 A 10/1998 Adams
5,830,063 A 11/1998 Byrne
5,830,066 A 11/1998 Goden et al.
5,830,067 A 11/1998 Graves et al.
5,833,537 A 11/1998 Barrie

| | | | | | |
|---|---|---|---|---|---|
| 5,835,576 | A | | 11/1998 | Katz et al. | |
| 5,836,086 | A | | 11/1998 | Elder | |
| 5,836,817 | A | | 11/1998 | Acres et al. | |
| 5,848,932 | A | | 12/1998 | Adams | |
| 5,863,075 | A | | 1/1999 | Rich et al. | |
| 5,871,398 | A | * | 2/1999 | Schneier et al. | 463/16 |
| 5,876,284 | A | | 3/1999 | Acres et al. | |
| 5,882,261 | A | | 3/1999 | Adams | |
| 5,883,537 | A | | 3/1999 | Luoni et al. | |
| 5,885,158 | A | | 3/1999 | Torango et al. | |
| 5,887,906 | A | | 3/1999 | Sultan | |
| 5,903,340 | A | | 5/1999 | Lawady et al. | |
| 5,911,418 | A | | 6/1999 | Adams | |
| 5,915,588 | A | | 6/1999 | Stoken et al. | |
| 5,934,671 | A | | 8/1999 | Harrison | |
| 5,970,143 | A | | 10/1999 | Shneier et al. | |
| 5,979,894 | A | * | 11/1999 | Alexoff | 273/139 |
| 5,996,997 | A | | 12/1999 | Kamille | |
| 5,997,044 | A | | 12/1999 | Behm et al. | |
| 6,004,207 | A | | 12/1999 | Wilson, Jr. et al. | |
| 6,004,208 | A | | 12/1999 | Wilson, Jr. et al. | |
| 6,007,162 | A | | 12/1999 | Hinz et al. | |
| 6,012,982 | A | | 1/2000 | Piechowiak et al. | |
| 6,014,819 | A | | 1/2000 | Maddix et al. | |
| 6,017,032 | A | | 1/2000 | Grippo et al. | |
| 6,024,640 | A | * | 2/2000 | Walker et al. | 463/17 |
| 6,024,641 | A | | 2/2000 | Sarno | |
| 6,033,307 | A | | 3/2000 | Vancura | |
| 6,053,405 | A | | 4/2000 | Irwin, Jr. et al. | |
| 6,059,191 | A | * | 5/2000 | Sedlak et al. | 235/492 |
| 6,077,162 | A | | 6/2000 | Weiss | |
| 6,080,062 | A | | 6/2000 | Olson | |
| 6,086,477 | A | | 7/2000 | Walker et al. | |
| 6,089,978 | A | | 7/2000 | Adams | |
| 6,099,407 | A | | 8/2000 | Parker, Jr. et al. | |
| 6,102,400 | A | | 8/2000 | Scott et al. | |
| 6,107,913 | A | | 8/2000 | Gatto et al. | |
| 6,119,364 | A | | 9/2000 | Elder | |
| 6,125,368 | A | | 9/2000 | Bridge et al. | |
| 6,142,872 | A | | 11/2000 | Walker et al. | |
| 6,146,272 | A | | 11/2000 | Walker et al. | |
| 6,149,521 | A | | 11/2000 | Sanduski | |
| 6,155,491 | A | | 12/2000 | Dueker et al. | |
| 6,168,521 | B1 | | 1/2001 | Luciano et al. | |
| 6,168,522 | B1 | | 1/2001 | Walker et al. | |
| 6,179,710 | B1 | | 1/2001 | Sawyer et al. | |
| 6,203,430 | B1 | | 3/2001 | Walker et al. | |
| 6,206,373 | B1 | | 3/2001 | Garrod | |
| 6,210,275 | B1 | | 4/2001 | Olsen | |
| 6,217,448 | B1 | | 4/2001 | Olsen | |
| 6,220,596 | B1 | | 4/2001 | Horan | |
| 6,220,961 | B1 | | 4/2001 | Keane et al. | |
| 6,224,055 | B1 | | 5/2001 | Walker et al. | |
| 6,227,969 | B1 | | 5/2001 | Yoseloff | |
| 6,238,288 | B1 | | 5/2001 | Walker et al. | |
| 6,309,300 | B1 | | 10/2001 | Glavich | |
| 6,312,334 | B1 | | 11/2001 | Yoseloff | |
| 6,315,291 | B1 | | 11/2001 | Moody | |
| 6,330,976 | B1 | | 12/2001 | Dymetman et al. | |
| 6,331,143 | B1 | | 12/2001 | Yoseloff | |
| 6,334,814 | B1 | | 1/2002 | Adams | |
| 6,340,158 | B2 | | 1/2002 | Pierce et al. | |
| 6,368,213 | B1 | | 4/2002 | McNabola | |
| 6,375,568 | B1 | | 4/2002 | Roffman et al. | |
| 6,379,742 | B1 | * | 4/2002 | Behm et al. | 427/7 |
| 6,394,899 | B1 | | 5/2002 | Walker et al. | |
| 6,398,214 | B1 | | 6/2002 | Moteki et al. | |
| 6,398,643 | B1 | | 6/2002 | Knowles et al. | |
| 6,398,644 | B1 | | 6/2002 | Perrie et al. | |
| 6,398,645 | B1 | | 6/2002 | Yoseloff | |
| 6,402,614 | B1 | * | 6/2002 | Schneier et al. | 463/17 |
| 6,416,408 | B2 | | 7/2002 | Tracy et al. | |
| 6,419,579 | B1 | | 7/2002 | Bennett | |
| 6,435,408 | B1 | | 8/2002 | Irwin, Jr. et al. | |
| 6,435,500 | B2 | | 8/2002 | Gumina | |
| 6,478,677 | B1 | | 11/2002 | Moody | |
| 6,491,215 | B1 | | 12/2002 | Irwin, Jr. et al. | |
| 6,497,408 | B1 | | 12/2002 | Walker et al. | |
| 6,552,290 | B1 | | 4/2003 | Lawandy | |
| 6,588,747 | B1 | | 7/2003 | Seelig | |
| 6,599,186 | B1 | | 7/2003 | Walker et al. | |
| 6,599,187 | B2 | * | 7/2003 | Gerow | 463/17 |
| 6,601,772 | B1 | | 8/2003 | Rubin et al. | |
| 6,607,439 | B2 | * | 8/2003 | Schneier et al. | 463/17 |
| 6,637,747 | B1 | | 10/2003 | Garrod | |
| 6,648,735 | B2 | | 11/2003 | Miyashita et al. | |
| 6,648,753 | B1 | | 11/2003 | Tracy et al. | |
| 6,648,755 | B1 | | 11/2003 | Luciano et al. | |
| 6,676,126 | B1 | | 1/2004 | Walker et al. | |
| 6,692,354 | B2 | | 2/2004 | Tracy et al. | |
| 6,702,047 | B2 | | 3/2004 | Huber | |
| 6,773,345 | B2 | | 8/2004 | Walker et al. | |
| 6,776,337 | B2 | * | 8/2004 | Irwin et al. | 235/441 |
| 6,786,824 | B2 | | 9/2004 | Cannon | |
| 6,823,874 | B2 | | 11/2004 | Lexcen | |
| 6,875,105 | B1 | | 4/2005 | Behm et al. | |
| 6,929,186 | B2 | | 8/2005 | Lapstun | |
| 7,008,317 | B2 | * | 3/2006 | Cote et al. | 463/16 |
| 7,374,098 | B2 | * | 5/2008 | Salib et al. | 235/492 |
| 2001/0027130 | A1 | | 10/2001 | Namba et al. | |
| 2001/0030978 | A1 | | 10/2001 | Holloway et al. | |
| 2001/0034262 | A1 | | 10/2001 | Banyai | |
| 2001/0040345 | A1 | | 11/2001 | Au-Yeung | |
| 2001/0044337 | A1 | * | 11/2001 | Rowe et al. | 463/29 |
| 2002/0022511 | A1 | | 2/2002 | Eklund et al. | |
| 2002/0039917 | A1 | * | 4/2002 | Armstrong et al. | 463/16 |
| 2002/0053597 | A1 | | 5/2002 | Ehrhart et al. | |
| 2002/0084335 | A1 | | 7/2002 | Ericson | |
| 2002/0090986 | A1 | * | 7/2002 | Cote et al. | 463/16 |
| 2002/0098882 | A1 | * | 7/2002 | Lind et al. | 463/17 |
| 2002/0169018 | A1 | * | 11/2002 | Schneier et al. | 463/17 |
| 2002/0171201 | A1 | | 11/2002 | Au-Yeung | |
| 2002/0187825 | A1 | | 12/2002 | Tracy et al. | |
| 2003/0042306 | A1 | * | 3/2003 | Irwin et al. | 235/441 |
| 2003/0050109 | A1 | | 3/2003 | Caro et al. | |
| 2003/0114210 | A1 | | 6/2003 | Meyer et al. | |
| 2004/0038723 | A1 | * | 2/2004 | Schneier et al. | 463/17 |
| 2004/0053011 | A1 | * | 3/2004 | Behm et al. | 428/195 |
| 2004/0076310 | A1 | | 4/2004 | Hersch et al. | |
| 2004/0173965 | A1 | | 9/2004 | Stanek | |
| 2004/0178582 | A1 | | 9/2004 | Garrod | |
| 2004/0185931 | A1 | | 9/2004 | Hartman et al. | |
| 2004/0204222 | A1 | | 10/2004 | Roberts | |
| 2004/0229677 | A1 | * | 11/2004 | Gray et al. | 463/17 |
| 2004/0259631 | A1 | | 12/2004 | Katz et al. | |
| 2004/0266514 | A1 | | 12/2004 | Penrice | |

FOREIGN PATENT DOCUMENTS

| | | | |
|---|---|---|---|
| AU | B-21070/92 | | 7/1993 |
| AU | A-50327/96 | | 2/1997 |
| AU | B-52499/96 | | 2/1997 |
| AU | 199716432 | B2 | 9/1997 |
| AU | A-45403/97 | | 4/1998 |
| AU | A-63553/98 | | 10/1998 |
| DE | 2938307 | C2 | 4/1981 |
| DE | 3035898 | A1 | 4/1982 |
| DE | 3035947 | A1 | 5/1982 |
| DE | 2938307 | C3 | 6/1982 |
| DE | 3822636 | A1 | 1/1990 |
| DE | 2938307 | C3 | 8/1990 |
| DE | 3822636 | A1 | 1/1992 |
| DE | 3415114 | A1 | 10/1995 |
| DE | 19646956 | C1 | 5/1998 |
| DE | 19706286 | A1 | 5/1998 |
| DE | 29803107 | U1 | 8/1998 |
| DE | 29816453 | U1 | 3/1999 |
| DE | 19751746 | A1 | 5/1999 |
| EP | 0122902 | B1 | 4/1984 |
| EP | 0333934 | A1 | 9/1989 |
| EP | 0458623 | | 11/1991 |
| EP | 0798676 | A1 | 10/1997 |
| EP | 0799649 | A1 | 10/1997 |
| EP | 0149712 | A2 | 7/1998 |
| EP | 0874337 | A1 | 10/1998 |
| EP | 0896304 | A2 | 2/1999 |
| EP | 0914875 | A2 | 5/1999 |
| EP | 0914875 | A3 | 5/1999 |
| EP | 0919965 | A2 | 6/1999 |

| | | | |
|---|---|---|---|
| EP | 0983801 | A2 | 3/2000 |
| EP | 0983801 | A3 | 3/2001 |
| EP | 1149712 | A1 | 10/2001 |
| ES | 529535 | | 6/1983 |
| ES | 529536 | | 6/1983 |
| ES | 2006400 | | 4/1989 |
| ES | 2006401 | | 4/1989 |
| GB | 642892 | A | 9/1950 |
| GB | 2075918 | A | 11/1981 |
| GB | 2222712 | B | 3/1990 |
| GB | 2230373 | A | 10/1990 |
| GB | 2295775 | A | 12/1996 |
| GB | 3328311 | | 2/1999 |
| GB | 23282311 | A | 2/1999 |
| GB | 2 377 389 | | 1/2003 |
| JP | 02235744 | | 9/1990 |
| JP | 04132672 | | 5/1992 |
| WO | WO85/02250 | A1 | 5/1985 |
| WO | WO91/17529 | | 11/1991 |
| WO | WO 98/03910 | | 1/1998 |
| WO | WO 98/18527 | | 5/1998 |
| WO | WO 98/40138 | | 9/1998 |
| WO | WO 99/09364 | A1 | 2/1999 |
| WO | WO 99/26204 | | 5/1999 |
| WO | WO 99/39312 | | 8/1999 |
| WO | WO00/00256 | | 1/2000 |
| WO | WO00/78418 | A1 | 12/2000 |
| WO | WO01/74460 | A2 | 11/2001 |
| WO | WO01/93966 | A1 | 12/2001 |
| WO | WO02/056266 | A1 | 7/2002 |

OTHER PUBLICATIONS

'Are You In?', (Article).

'Beginner's Guide—How to Bet', (www.plimico.com/How+to+wager/beginnersguide/), (Internet Article), 3 Pgs.

Chip Brown, 'Austin American-Statesman', (Article), May 28, 1998, 2 Pgs., Texas.

John C. Hallyburton, Jr., 'Frequently Asked Questions About Keno', (Internet Article),1995, 1998, 10 Pgs., (http://conielco.com/faq/keno.html).

'Horse betting Tutorial—Types of Bets' (www.homepokergames.com/horsebettingtutorial.php), (Internet Article), 2 Pgs.

Judith Gaines, 'Pool Party Betting Business Booming Throughout Area Workplaces', (Internet Article), Mar. 19, 1994, 2 Pgs., Issue 07431791, Boston Globe, Boston, MA.

'Maryland Launches Let It Ride', (Internet Article), Circa 2001,1 Pg.

'Notice of Final Rulemaking', (Internet Article) Mar. 24, 2000, 10 Pgs., vol. 6, Issue #13, Arizona Administrative Register, Arizona.

'How to Play Megabucks', (Internet Article), Mar. 9, 2001, 2 Pgs., Oregon Lottery Megabucks,(http://www.oregonlottery.org/mega/m_howto.htm).

'How to Play Megabucks', (Internet Article), May 8, 2001, 2 Pgs., Oregon Lottery Megabucks, (http://www.oregonlottery.org/mega/m_howto.htm).

'Oregon Lottery', (Internet Article), Apr. 30, 2004, 9 Pgs., Oregon Lottery Web Center, (http://www.oregonlottery.org/general/g_hist.shtml).

'Powerball Odd & Prizes', 'How to Play Powerball', (Internet Article), Dec. 2002, 2 Pgs., (www.powerball.com/pbhowtoplay.shtm).

'Powerball Prizes and Odds', (Internet Article), 2 Pgs., http://www.powerball.com/pbprizesNOdds.shtm.

'Learn to Play the Races' (Internet Article), 15 Pgs., Racing Daily Form (www.drf.com).

Mike Parker, 'The History of Horse Racing' (Internet Article),1996, 1997, 1998, 5 Pgs., http://www.mrmike.com/explore/hrhist.htm.

* cited by examiner

PREPRINTED LOTTERY TICKETS USING A PLAYER ACTIVATED ELECTRONIC VALIDATION MACHINE

RELATED APPLICATION

This application claims the benefit of U.S. Provisional Application No. 60/675,186, Preprinted Lottery Tickets using a Player Activated Electronic Validation Machine, filed on Apr. 27, 2005, the specification of which is hereby incorporated in its entirety by this reference.

BACKGROUND OF THE INVENTION

1. Field of the Invention

The invention relates in general to lottery game apparatuses, and more particularly, the present invention relates to an electronic game apparatus that interacts with a lottery ticket.

2. Description of the Related Art

Scratch-off or instant win lottery tickets have been a staple of the lottery industry for decades. They have been enjoyed by billions of players over the world for years. Innovations in instant win ticket game design have sustained the product and allowed for growth. However, recently the instant win lottery ticket market sales increases have become relatively flat. One method of combating this undesirable trend is to produce higher payout instant win tickets. Most lottery jurisdictions regulate payout percentages by charter and therefore cannot utilize higher payout tickets as a means of increasing sales.

Another method is to expand the distribution of lottery tickets to new locations like super market checkout lanes. However, the logistics and security problems associated with placing instant lottery tickets in super market check out lanes has hitherto made this expanded distribution impractical.

A third method is to enlarge the lottery ticket to expand the limited amount of play (a.k.a. scratch-off) area to create an extended play experience. These larger tickets permit larger or multiple play areas (e.g., Bingo games). But, the physical size of a ticket can be increased only by a limited amount. Typically the largest tickets measure 4×10 inches and, at that size, are cumbersome. The players often perceive that the playing time does not reflect the higher cost of larger tickets.

It is therefore desirable to develop a new methodology of marketing instant win lottery tickets where the player perceives added value independent of increases in payout percentages. it is to such a methodology the present is primarily directed.

SUMMARY OF THE INVENTION

This invention is related to a methodology for using a player activated, electronic game device to determine the prize value of a preprinted lottery ticket through the use of entertaining digital games. Thus, the game device enhances the player's experience, and gives the lottery ticket a perceived extra value.

In one embodiment, there is disclosed a lottery game ticket for interfacing with an electronic game device that allows a user thereof to selectively play a game that has an outcome. The lottery game ticket includes a substrate, an encoded machine-readable game information embedded on the substrate, and an encoded machine-readable prize information embedded on the substrate. The encoded game information and encoded prize information is readable by the electronic game device such that the encoded game information determining a game for the electronic game device.

In another embodiment, there is disclosed a lottery game apparatus for enabling a user to play a lottery game. The lottery game apparatus is capable of extracting game data from a lottery game ticket and includes a game ticket interface unit for receiving game information and prize information from the lottery game ticket, a storage unit for storing a plurality of lottery games, a controller unit for selecting a game from the storage unit according to the game information received from the lottery game ticket in the game ticket interface unit, and a user interface unit for displaying the game to a user and receiving inputs from the user.

In yet another embodiment, there is disclosed a method of playing a lottery game using a lottery game ticket and a lottery game apparatus. The method includes the steps of interfacing the lottery game ticket at the lottery game apparatus, receiving game information from the lottery game ticket at the lottery game apparatus, selecting at the lottery game apparatus a game based on the game information, displaying the game to a user of the lottery game apparatus, receiving commands from the user at the lottery game apparatus, determining at the lottery game apparatus if the user is a winner, and awarding a prize to the user if the user is a winner.

Other objects, features, and advantages of the present invention will become apparent after review of the Brief Description Of The Drawings, Detailed Description Of The Invention, and Claims.

DETAILED DESCRIPTION OF THE INVENTION

Figure 1:
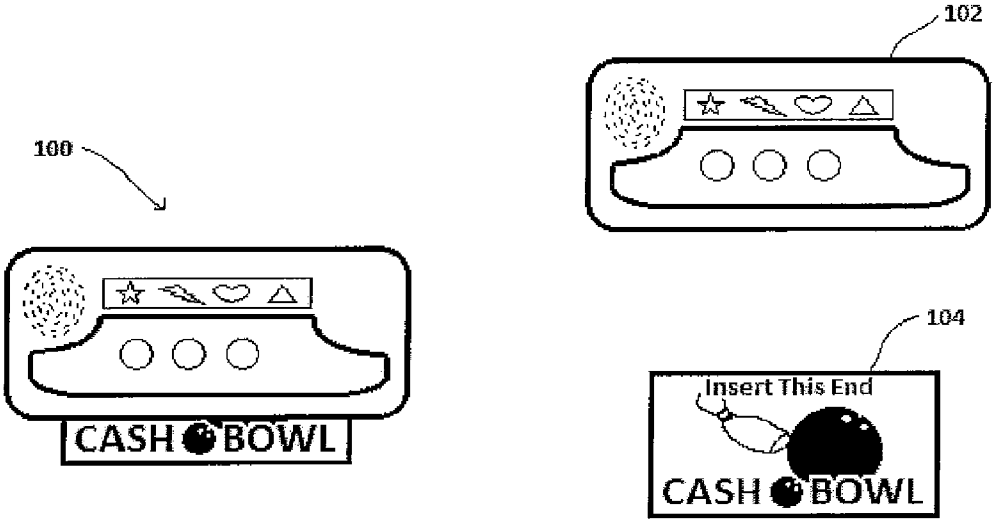
FIG. 1 is a game machine and a lottery ticket according to an exemplary embodiment of the invention.

FIG. 1 illustrates a hand held game machine 102 (game device) and a lottery game ticket 104 according to one embodiment of the invention. The game device 102 that accepts conventional-appearing lottery tickets 104 and provides a higher perceived value by dynamically enhancing the player's experience. The game device can be activated by a player with insertion of the lottery ticket as shown in 100. With the player activated game device, the player would purchase lottery tickets, insert the tickets into the game device, and play a computer type game in which the outcome (i.e., prize value) and game type were determined by the lottery ticket.

Figure 2:
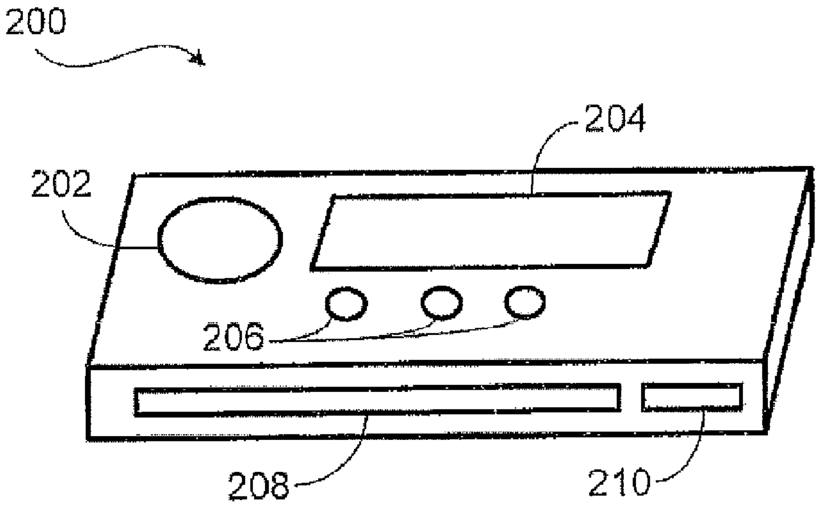
FIG. 2 illustrates one embodiment of a game machine.
Figure 3:
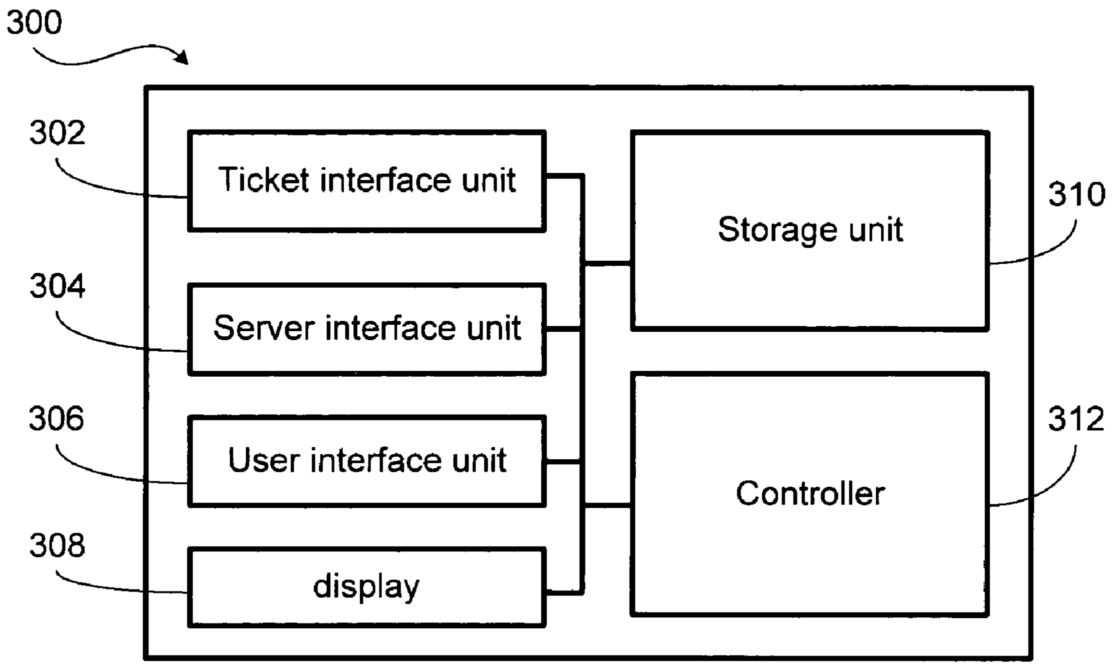
FIG. 3 illustrates a block diagram for a game machine.

FIG. 2 illustrates one embodiment 200 of the game device. The player activated game device is a relatively small, inexpensive electronic device, which is used in conjunction with (special) printed lottery tickets to create the gaming device. The game device includes a speaker 202, a display 204, a plurality of control buttons 206, a slot for inserting the lottery game ticket 208, and, optionally, an interface port 210 for interfacing with a game server. FIG. 3 illustrates a block diagram 300 of a game device. The game device includes a ticket interface unit 302, a server interface unit 304, a user interface unit 306, a display unit 308, a storage unit 310, and a controller 312. The game device is used with a special lottery game ticket. The game device may be purchased by a player or alternatively be given away for free by a lottery game authority. The game device stores different games in its storage unit 310 and will select a game to play according to the lottery game ticket inserted into the slot 208. The game information is retrieved fro the lottery ticket and delivered to the controller 312 through the ticket interface unit 302. The game information is used to select a game from the storage unit 310. The selected game is then displayed on the display 204 through the display unit 308. The player may control the game through the buttons 206 and commands are received from the user interface unit 306. The commands may affect the game that is being played. Besides the visual display, the game may also have audio output played on the speaker 202, thus giving the player a better game experience.

After the game is over, the game device will determine whether the player is a winner. If the player is a winner, then the game device will award a prize to the player. The prize is predetermined by the prize information embedded in the lottery game ticket. The prize awarded is recorded and stored in the game device and the player can take the game device to a lottery agent, or where a game server is located, and obtain the payout. The lottery agent will connect the game device to the game server through the interface port 210, and the award information is passed to the game server from the storage unit 310 through the server interface unit 304. After the award information is passed to the game server, the game device will clear the award information from its memory (storage unit). Alternatively, the player may delay the redeeming of the award to a later time. The player may choose to purchase another lottery game ticket and play another game. If the player wins again, the new award will be added to the award stored in the storage unit 310, and the player may redeem all the awards at once.

Figure 4:
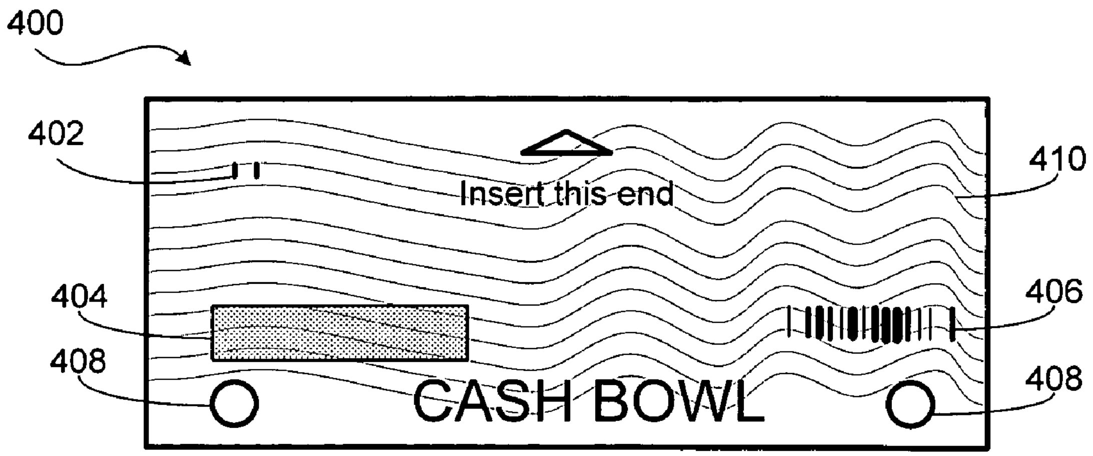
FIG. 4 illustrates one embodiment of a lottery game ticket.

The game device is used to play games encoded on special lottery tickets. The lottery tickets cannot be played without using the game device. The combination is somewhat like the marketing of other known products, such as the Gillette razor. The game device can be almost given away. It is the blades (i.e., the special tickets) that cost the money and make the lottery's profit. FIG. 4 illustrates a special lottery ticket 400 for use with the game device. The lottery ticket 400 made from a substrate and may be embedded with a plurality of conductive ink jumpers 402, a scratch-off area 404 with some hidden information, a barcode 406, a plurality of buttons 408, and special counterfeiting patterns 410. The prize information may be encoded in the special lottery ticket's conductive ink jumpers 402 using binary math according to one embodiment of the invention. Thus, two jumpers 402 will permit encoding four prize levels; four jumpers will permit encoding 16 prize levels, etc. The game device reads the ink pattern data and then learns what the prize value is and the type of game to be played. The validation barcode 406 could be the traditional lottery Interleaved Two-of-Five (I2of5) number with an associated validation number. The barcode 406 may be synchronized with the special ink pattern so the two agree on the prize amount. The special lottery ticket 400 will add to the play value of the game device by adding, as an example, push-buttons 408 on the tickets which control the action of the game device, or circuitry that controls the game device play action or play outcome.

Alternatively, the play information may be represented as an encrypted barcode (e.g., code 128). This play information may include such things as the game to be played, the Prize Level of the Ticket, the value of the 3 Box Digits (a.k.a. Validation Number), etc. This barcode will be read by the game device prior to playing the game encoded in the ticket.

The lottery ticket may also employ a scratch-off area 404 protected by an electrical circuitry (not shown) embedded in the lottery ticket. When the ticket is inserted into the game device, the device will read the jumpers to determine the game type and prize value, and then prompt the player to scratch-off the specific area protected by the circuitry to reveal a validation number. When the player has scratched off the latex (sensed by the circuitry) the game will proceed. The electrical circuitry senses the scratch-off coating is first intact and then destroyed. This sensing process both stigmatizes the ticket (i.e., ensures that it cannot be played again) and protects against unscrupulous retailers prescreening tickets for high-tier winners.

In all of the embodiments, the player uses a special lottery ticket to activate the game device, play a computer style game, and (possibly) win a prize determined by the lottery ticket. Unique lottery tickets are used to actuate the game device, to permit standard game device hardware and software manufacturing—i.e., all game devices are identical, with the differences in games and play determined by the lottery ticket. This standardization of game device hardware and software greatly reduces the logistical complexity of handling seeded (i.e., different prize outcome) electronic cards, reduces costs of the game device or electronic card, and changes the economics of electronic card sales (i.e., one game device may play several games actuated by multiple different lottery tickets) allowing the game device to be sold at costs or even given away. Thus, the player activated game device and associated custom lottery tickets build on the lottery ticket product by offering dynamic game action and even sound to correspondingly enhance the player experience and perceived value.

Besides the special conductive ink jumpers that allow information to be encoded on what is otherwise a standard instant win lottery ticket, other electrical configurations, such as direct electrical contact, Radio Frequency (RF) identification, and capacitive or magnetic coupling between the game device and a unique Electronic Lottery Ticket (ELT) may also be used. Examples of the types of information that can be transferred include but are not limited to such things as a game type identifier, prize level, and activation code. Alternate embodiments include the use of a variety of one dimensional (1D) and two dimensional (2D) encrypted barcodes on the printed ticket, which are read and decrypted by the game device.

In all cases, the game device can contain a variety of game types and prize levels of which specific types and outcomes are then activated when the game device reads the lottery ticket data. When the lottery ticket is inserted into the game device, the ticket data is transferred from the lottery ticket to the game device and the game device then presents the appropriate game to the player. Because the ticket's game is contained within a storage unit, which is an electronic memory, the playtime and thus perceived value of the game can be increased far beyond the capability of a standard scratch off lottery ticket. Lottery tickets measuring 2×4 inches, as an example, could produce a game that lasts for several minutes.

The use of a graphics display and associated game device sound bites makes the new ticket game a multi-media experience. Winning plays can be announced both visually and audibly. Anticipated capabilities include the possibility of physically modifying the ticket characteristics (by scratching areas on the ticket) during game play to add another dimension to the game.

The use of programmable memory or external memory 'pods' will permit the player to personalize his game device so that it contains, for example, only preferred game types or prize levels. Contents of the game device can thus be modified at the Point Of Sale. By connecting the game device to a game server at the point of sale, for example, the game device can be updated with player's favorite numbers or purchase record, or name and password to provide player allegiance information or provide gifts or coupons based upon the record of purchases. Additionally, the multi-media capability of the game device provides a unique opportunity to display local advertisements or announcements for a player or region unique parameter, for example, "Jim's shop at Bill's Variety". Thus, the lottery authority may generate additional income with sales of ads for the game devices.

Because the game device is not a gambling device per se (the lottery ticket is the gambling component), sales of the device may avoid limitations associated with standard lottery tickets. For example, the game device may be sold anywhere containing only conventional games of skill (e.g., Tetris) and the owner can then purchase lottery tickets at the conventional lottery outlet to play gambling style games. This characteristic of the game device may permit downloading games over the Internet as an example.

In the embodiments that employ the electrical circuitry, the lottery ticket as previously mentioned, is printed with a variety of conductive electronic circuits. These circuits may be unique on each ticket by the use of conductive ink-jet inks. However, because standard printing processes (e.g., intaglio, flexo, etc.) print a repetitive sequence of tickets, a laser trim technique may be used to produce randomly unique tickets.

A unique solution to the standard printing process problem is as follows. Several different prize levels are printed on a single symmetrical ticket—e.g., four prize levels on the four sides of a square or eight prize levels on the eight sides of an octagon or a multiplicity of 'spokes' of data printed on a circular ticket. A single scratch area on the ticket reveals ink-jet imager information that tells the player which side (i.e., what orientation) of the ticket to interface with the game device. The encrypted barcode on the reverse of the ticket is synchronized with this ink-jet image. This technique obviates the necessity of printing unique conductive circuitry on each ticket.

Additional circuits (some scratchable and some not) located on the lottery ticket can be used for a variety of functions including starting the game, ending the game, changing the game's play sequence, and even serving as pushbuttons to provide additional control capability.

Furthermore, lottery tickets can be used to provide an activation code for the game device. For example, the lottery tickets could contain an encrypted barcode. The barcode would be read and decrypted at the point of sale and used to generate a sales slip containing a multi-digit activation key, which is synchronized with the lottery ticket. Later when the lottery ticket is inserted into the game device, the information contained on the lottery ticket is read by the game device and used, as a key to determine if the activation key data entered by the game device keypad is correct. Theft of game devices would thus be discouraged since the stolen unit would not function without the sales receipt.

Figure 5:
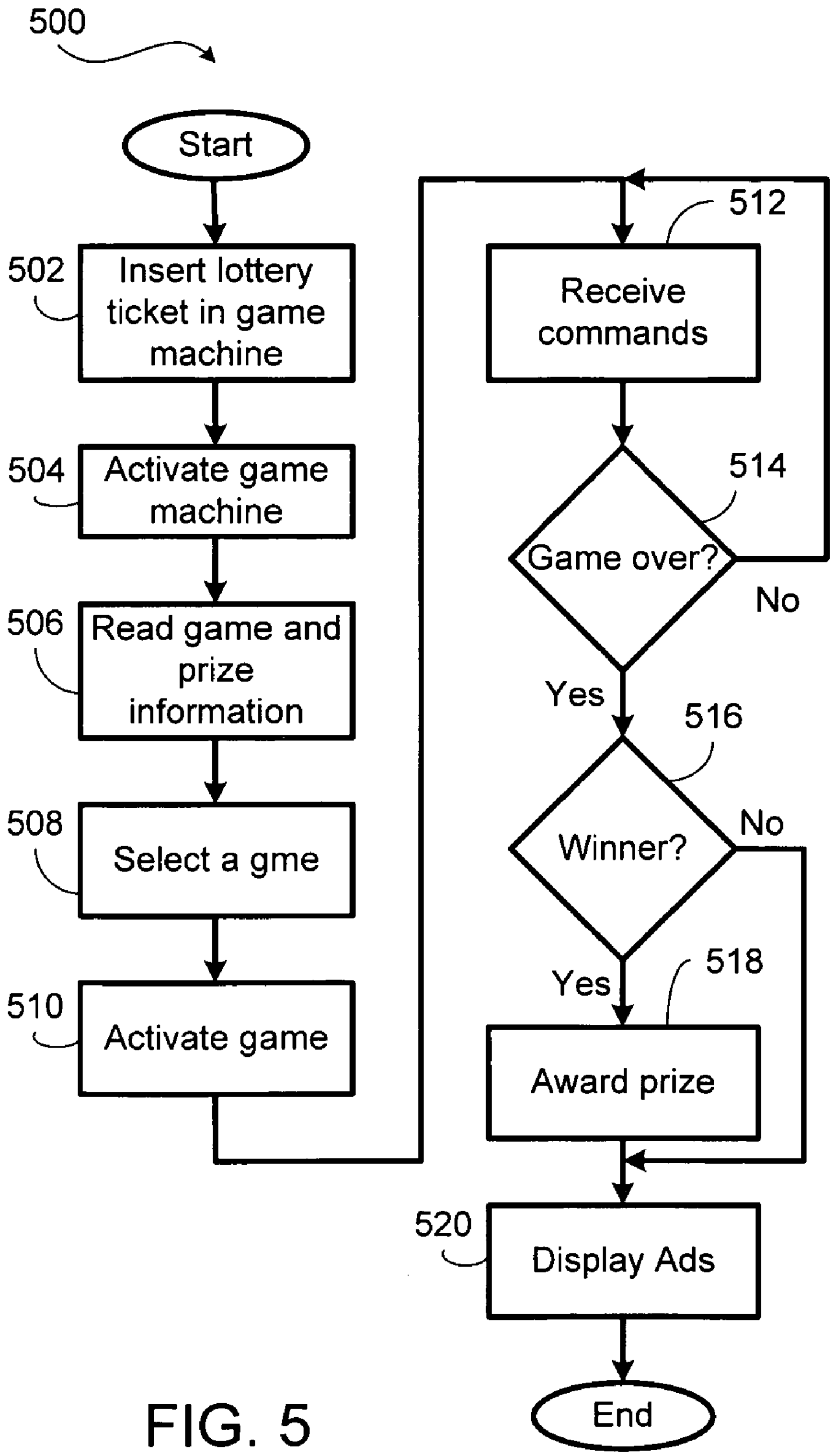
FIG. 5 is a flowchart for a game machine process.

FIG. 5 illustrates one embodiment of a game process 500 for a game device. A player may purchase a special lottery ticket at a lottery point of sales. When purchasing the lottery ticket, the player may select games that he wants to play at his game machine and he may also set a personal identification code (PIN) for the lottery ticket. The player may purchase the game machine at the same lottery point of sales, or alternatively may obtain the game machine for free as part of some promotion. After purchasing the lottery ticket, the player insert the lottery game machine, step 502, and the game machine will then be activated, step 504. The game machine will read the game and prize information from the lottery ticket, step 506, and use the game information to select a game for the player to play, step 508. The games in the game machine are pre-loaded onto the game machine and the player may connect the game machine to a lottery authority game server to download new games. Alternatively, the player may also take the game machine to a lottery point of sales to download the new games.

After selecting a game from a plurality of games stored in its memory, the game machine activates the game, step 510, and receives commands from the player, step 512. The game will be displayed on the display screen and may also emit sounds through the speaker on the game machine. The player plays the game using the buttons on the game machine. Alternatively, the player may also play the game using the buttons on the lottery ticket, if the lottery ticket is so equipped. The game playing time may also be affected by the game information received from the lottery ticket. For example, if the player has played $5 instead of $1, the player may be eligible to play for 10 minutes instead of three minutes.

When the game is over, the game machine checks whether the player is a winner, step 516. If the player is not a winner, the game machine will either display a static "game over" image or ads from different sponsors, step 520. The game machine may receive ads from the game server. If the player is a winner, the game machine will award the prize to the player, step 518. The prize is predetermined by the lottery game ticket. The award will be stored in the game machine and the player can redeem the award for cash by taking the game machine to an authorized lottery point of sales. By connecting the game machine to the lottery game server, the award information can be downloaded to the game server and the displayed to the lottery authority. After downloading the award to the game server, the game machine will clear its award memory. The lottery authority may then issue cash payment to the player. Alternatively, the player may choose to continue to play other lottery games by inserting new lottery tickets into the game machine. The awards from these additional lottery games will be accumulated in the game machine and the player can redeem the all accumulated awards at once.

Alternatively, the award may be independent from the game. For example, the lottery ticket may be an instant win lottery ticket and by scratching off an area of the lottery ticket, the player may know instant whether his is a winner. Even though the player is not a winner, by inserting the lottery ticket into the game machine, the player is entitled to play a game at the game machine.

In the context of FIG. 5, the method may be implemented, for example, by operating a computer to execute a sequence of machine-readable instructions. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to one embodiment thereof, it will be understood by those skilled in the art that various changes in form and detail may be made without departing from the spirit and scope of the present invention as set forth in the following claims. Though the method in FIG. 5 is illustrated in sequential steps, those skilled in the art will appreciate the different sequences may also be used to implement the invention. Furthermore, although elements of the invention may be described or claimed in the singular, the plural is contemplated unless limitation to the singular is explicitly stated.

What is claimed is:

1. A lottery game ticket for interfacing with a hand held electronic game device having instructions for play of a plurality of different types of lottery games stored therein, whereby a player purchases the lottery ticket for selective play of one of the lottery games stored in the electronic game device, the lottery game ticket comprising:

a substrate;

an encoded machine-readable game information embedded on the substrate the game information containing instructions for the hand held game device to retrieve a particular lottery game stored in the device for subsequent play by the player via issuing commands to the hand held game device by which the player controls play action of the game retrieved by the hand held game device wherein the game device contains a variety of games, prize levels and outcomes such that at least one particular game, prize level and outcome are activated in response to the game information embedded on the substrate;

an encoded machine-readable prize information embedded on the substrate, the prize information determining whether the lottery game played by the user on the hand held game device is a winner as well as the value of the prize awarded; and wherein the outcome of the lottery game enabled by the encoded game information and encoded prize information is only revealed to the player via play of the lottery game on the hand held game device.

2. The lottery game ticket of claim 1, further comprising an encoded validation information embedded on the substrate that is read by the hand held game device upon insertion of the lottery ticket therein, the validation information preventing subsequent attempts to use the lottery ticket for additional plays.

3. The lottery game ticket of claim 2, wherein the validation information is encoded by an electrical circuit printed on the substrate and covered by a scratch-off material.

4. The lottery game ticket of claim 1, further comprising at least one control button capable of controlling the game displayed on the electronic game device.

5. The lottery game ticket of claim 1, wherein the prize information and game information are encoded with conductive ink circuits printed on the substrate.

6. The lottery game ticket of claim 1, wherein the game information and prize information are encoded by a radio frequency data provided on the substrate.

7. The lottery game ticket of claim 1, further comprising at least one control button on the lottery ticket capable of controlling the game displayed.

8. A hand held electronic lottery game apparatus for enabling a user to play a lottery game enabled by a lottery ticket purchased by the user, the lottery game apparatus comprising:

a game ticket interface unit configured for receipt of the lottery ticket and reading game information and prize information from the lottery game ticket;

a storage unit for storing instructions for play of a plurality of different lottery games wherein the storage unit contains a variety of games, prize levels and outcomes such that at least one particular game, prize level and outcome are activated in response to the game information and prize information embedded on the lottery ticket;

a controller unit for selecting a lottery game from the storage unit according to the game information received from the lottery game ticket; and a user interface unit for displaying the game to a user and receiving commands from the user so that the user controls play action of the lottery game on the hand held lottery game apparatus to reveal the outcome of the lottery game.

9. The lottery game apparatus of claim 8, wherein the user interface unit comprises a display that graphically displays the lottery game to the user as the game is played via inputs by the user.

10. The lottery game apparatus of claim 8, wherein the storage unit is configured to store payout information for the particular lottery game enabled by the game ticket inserted into the game ticket interface unit.

11. The lottery game apparatus of claim 8, wherein the controller and game ticket interface unit further are configured for encoding game winning information on the lottery game ticket.

12. The lottery game apparatus of claim 8, wherein the game ticket interface unit is configured for reading the game information and prize information from conductive ink circuitry printed on the lottery game ticket.

13. The lottery game apparatus of claim 8, wherein the game ticket interface unit is configured for reading the game information and prize information from radio frequency transmitted data from the lottery game ticket.

14. The lottery game apparatus of claim 8, further comprising a server interface unit for interfacing and communicating with a game server for receipt of games to be played on the hand held game apparatus, and for sending results of the lottery games played on the hand held game apparatus to the game server.

15. A method of playing a lottery game using a lottery game ticket and a hand held electronic lottery game apparatus, comprising the steps of:

encoding machine readable game information and prize information on a lottery game ticket that is purchased by a player;

interfacing the lottery game ticket with the hand held lottery game apparatus wherein the hand held lottery game apparatus contains a variety of games, prize levels and outcomes and that reads the game and prize information from the lottery game ticket;

based on the game information encoded on the lottery game ticket, selecting a particular lottery game to be played from a plurality of different lottery games stored in the hand held lottery game apparatus as well as selecting a prize level and outcome in response to the game and prize information embedded on the lottery ticket;

displaying the game to the user on the hand held lottery game apparatus, and playing the lottery game via the user issuing commands to the hand held lottery game apparatus by which the player controls play action of the displayed game on the hand held game device;

determining at the lottery game apparatus if the user is a winner as a function of the prize information encoded on the lottery game ticket; and displaying to the user via the hand held lottery game apparatus if the user is a winner and the value of any prize awarded.

16. The method of claim 15, further comprising receiving a validation code from the user via the hand held lottery game apparatus that authenticates the lottery game ticket and enables play of the lottery game.

17. The method of claim 15, comprising receiving or updating the stored plurality of games from a game server by interfacing the hand held lottery game apparatus with the server.

18. The method of claim 17, further comprising sending payout information related to any prize awarded for lottery games played on the hand held lottery game apparatus to the game server.

19. The method of claim 15, comprising storing the prize information in the hand held lottery game apparatus, whereby the user presents the apparatus at a later time for retrieval of the prize information and payout of the prize award.

* * * * *